US011040730B2

(12) United States Patent
Andreae et al.

(10) Patent No.: US 11,040,730 B2
(45) Date of Patent: Jun. 22, 2021

(54) ADJUSTABLE TRANSFER MECHANISM FOR CONVEYORS

(71) Applicant: SST Systems, Inc., Sturgeon Bay, WI (US)

(72) Inventors: Bradley S. Andreae, Sturgeon Bay, WI (US); Anthony C Scoville, Sturgeon Bay, WI (US)

(73) Assignee: SST Systems, Inc., Sturgeon Bay, WI (US)

( * ) Notice: Subject to any disclaimer, the term of this patent is extended or adjusted under 35 U.S.C. 154(b) by 437 days.

(21) Appl. No.: 16/209,132

(22) Filed: Dec. 4, 2018

(65) Prior Publication Data

US 2019/0168780 A1 Jun. 6, 2019

Related U.S. Application Data

(60) Provisional application No. 62/594,205, filed on Dec. 4, 2017.

(51) Int. Cl.
*B61B 10/02* (2006.01)
*B65G 19/02* (2006.01)
*B65G 9/00* (2006.01)
*B65G 47/64* (2006.01)

(52) U.S. Cl.
CPC ............ *B61B 10/025* (2013.01); *B65G 9/008* (2013.01); *B65G 19/025* (2013.01); *B65G 47/64* (2013.01); *B65G 2812/02079* (2013.01)

(58) Field of Classification Search
CPC ...... B65G 9/008; B65G 19/025; B65G 23/36; B65G 47/61; B65G 47/64; B65G 2812/02079; B61B 10/025
See application file for complete search history.

(56) References Cited

U.S. PATENT DOCUMENTS

| 3,623,538 | A | * | 11/1971 | Wakabayashi | ........ | B61B 10/025 |
| | | | | | | 104/172.4 |
| 3,812,787 | A | * | 5/1974 | Kling | .................... | B61B 10/025 |
| | | | | | | 104/96 |
| 47,711,700 | | * | 9/1988 | Wakabayashi | ........ | B61B 10/025 |
| | | | | | | 104/172.3 |
| 5,517,922 | A | * | 5/1996 | Summa | ................. | B61B 10/025 |
| | | | | | | 104/172.1 |

(Continued)

*Primary Examiner* — Gene O Crawford
*Assistant Examiner* — Keith R Campbell
(74) *Attorney, Agent, or Firm* — Michael Best & Friedrich LLP

(57) ABSTRACT

An adjustable transfer mechanism for a power and free conveyor system includes a free track defining a conveyor path. A first power track defines a first drive path for a first drive member of the first power track to drive a trolley. The first power track is positioned to extend along the conveyor path up to a divergence point where the first power track diverges from the conveyor path. A second power track defines a second drive path for a second drive member of the second power track to drive the trolley. The second power track is positioned to extend along the conveyor path from a convergence point downstream of the divergence point so that the second drive member can pick up the trolley dropped off by the first power track. At least one of the divergence and convergence points is adjustable along the conveyor path.

20 Claims, 7 Drawing Sheets

(56) References Cited

U.S. PATENT DOCUMENTS 5,606,915 A * 3/1997 Harris ................ B61B 10/02
                                                                     104/172.4
6,487,976 B1 * 12/2002 Robison ............ B61B 10/025
                                                                     104/172.2

* cited by examiner

_US 11,040,730 B2_

ADJUSTABLE TRANSFER MECHANISM FOR CONVEYORS

CROSS-REFERENCE TO RELATED APPLICATIONS

This application claims priority to U.S. Provisional Application No. 62/594,205, filed Dec. 4, 2017, the entire contents of which are incorporated by reference herein.

BACKGROUND

The present invention relates to conveyor systems. In some aspects, the invention relates particularly to the transfer of trolleys supported on a free track of a power and free conveyor system between two different power tracks of the power and free conveyor system. U.S. Pat. No. 5,517,922 discloses the general operating principles of power and free conveyors, in which trolleys are supported by a free track and drivable from above by pusher members or so-called dogs that protrude from an endless drive chain supported in a power track. Such conveyor systems are utilized to facilitate various operations within industrial facilities, and the power and free conveyor system enables the trolleys on the free track to be transferred via a hand-off from one power track to another power track. A number of examples of such transfer zones are shown schematically in FIGS. 11a-11h of U.S. Pat. No. 5,517,922. However, in practice, there remains a high degree of variability and unpredictability in power and free transfer zones leading to problems in completing the hand-off between two power tracks. Such problems include jams (i.e., not fully releasing the trolley from the dog of one power track before engaging the trolley with the dog of another power track) and incompletions (i.e., not propelling the trolley far enough down the free track with the first power track to be picked up by the second power track). Following permanent installation, there may be no opportunity to tune or adjust the handoff, and a workaround or fallback such as a worker monitoring the transfer zone and manually urging a trolley, may become necessary at times.

SUMMARY

In one aspect, the invention provides an adjustable transfer mechanism for a power and free conveyor system. A free track defines a conveyor path for receiving a trolley to be conveyed. A first power track defines a first drive path for a first drive member of the first power track to drive the trolley along the free track. The first power track is positioned to extend along the conveyor path up to a divergence point where the first power track diverges from the conveyor path so that the first drive member can drop off the trolley within a transfer zone. A second power track defines a second drive path for a second drive member of the second power track to drive the trolley along the free track. The second power track is positioned to extend along the conveyor path from a convergence point in a downstream direction from the divergence point so that the second drive member can pick up the trolley within the transfer zone. At least one of the divergence and convergence points is adjustable along the conveyor path.

In another aspect, the invention provides a method of operating a power and free conveyor system including an adjustable transfer mechanism. A first power track is provided to extend along a conveyor path defined by a free track and subsequently diverge from the conveyor path to define a drop-off point whereby a first drive member of the first power track disengages from driving a first trolley positioned on the free track. A second power track is provided to converge toward the conveyor path to define a pick-up point whereby a second drive member of the second power track engages with the first trolley positioned on the free track. An adjustment mechanism is operated to adjust a spacing between the drop-off point and the pick-up point by repositioning a section of at least one of the first and second power tracks within the adjustable transfer mechanism so that a distance between the drop-off point and the pick-up point is increased or decreased. The first power track and the second power track are operated to transfer a subsequent trolley therebetween with the adjusted spacing between the drop-off point and the pick-up point.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the accompanying drawings. The invention is capable of other embodiments and of being practiced or of being carried out in various ways.

Figure 1:
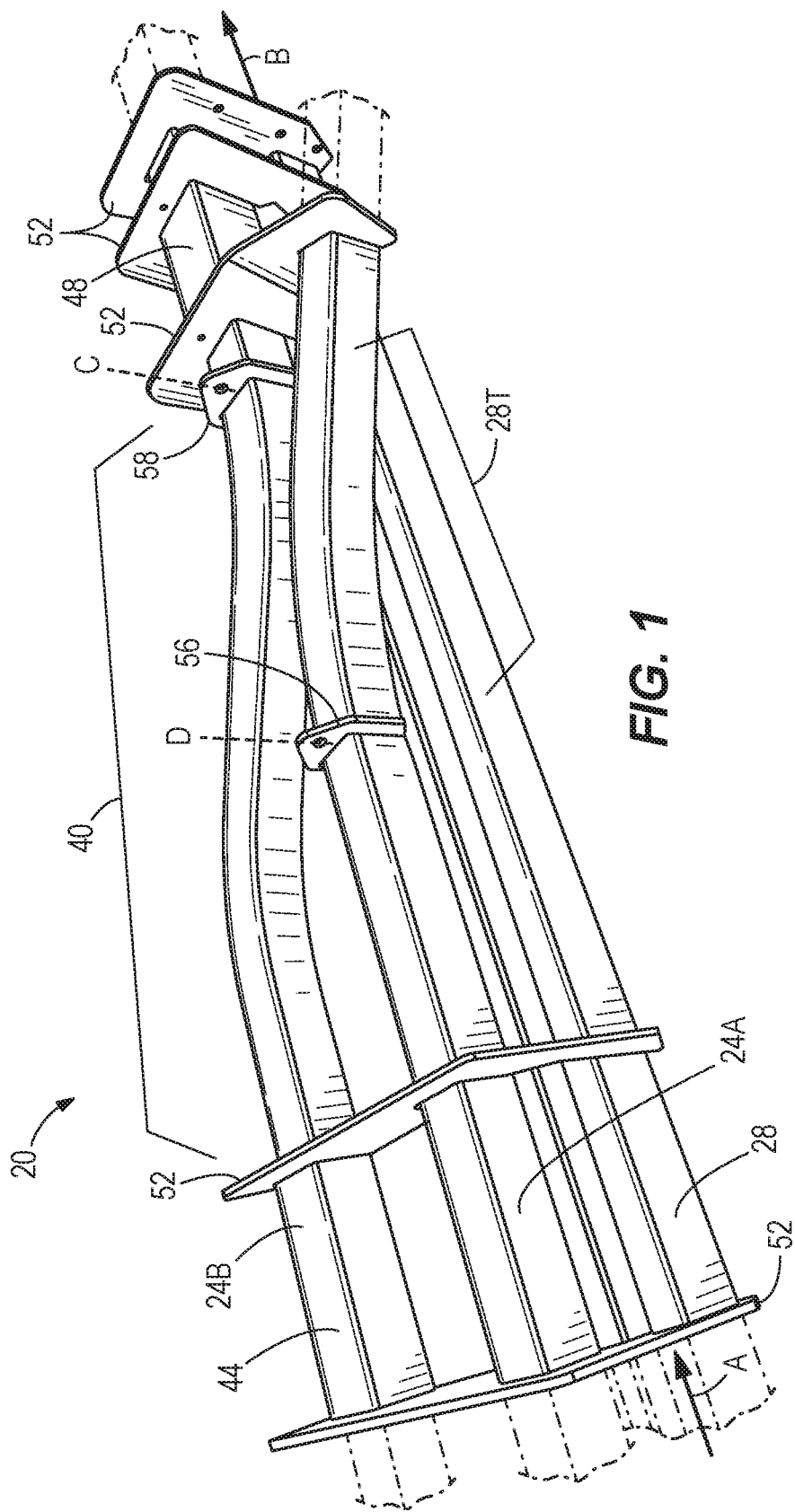
FIG. 1 is a perspective view of a conveyor transfer mechanism according to one embodiment of the present disclosure.
Figure 2:
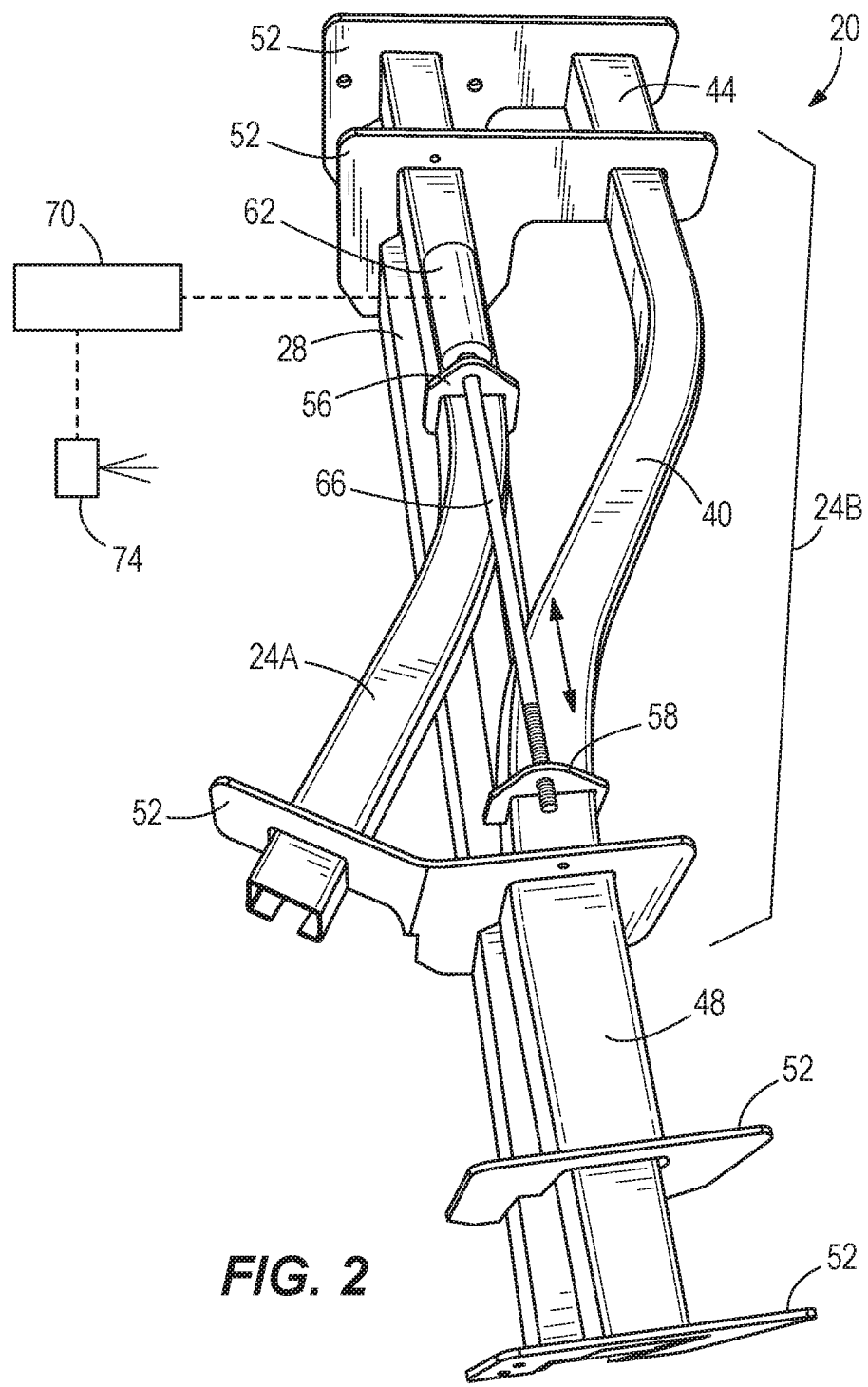
FIG. 2 is an alternate perspective view of the conveyor transfer mechanism of FIG. 1.
Figure 3:
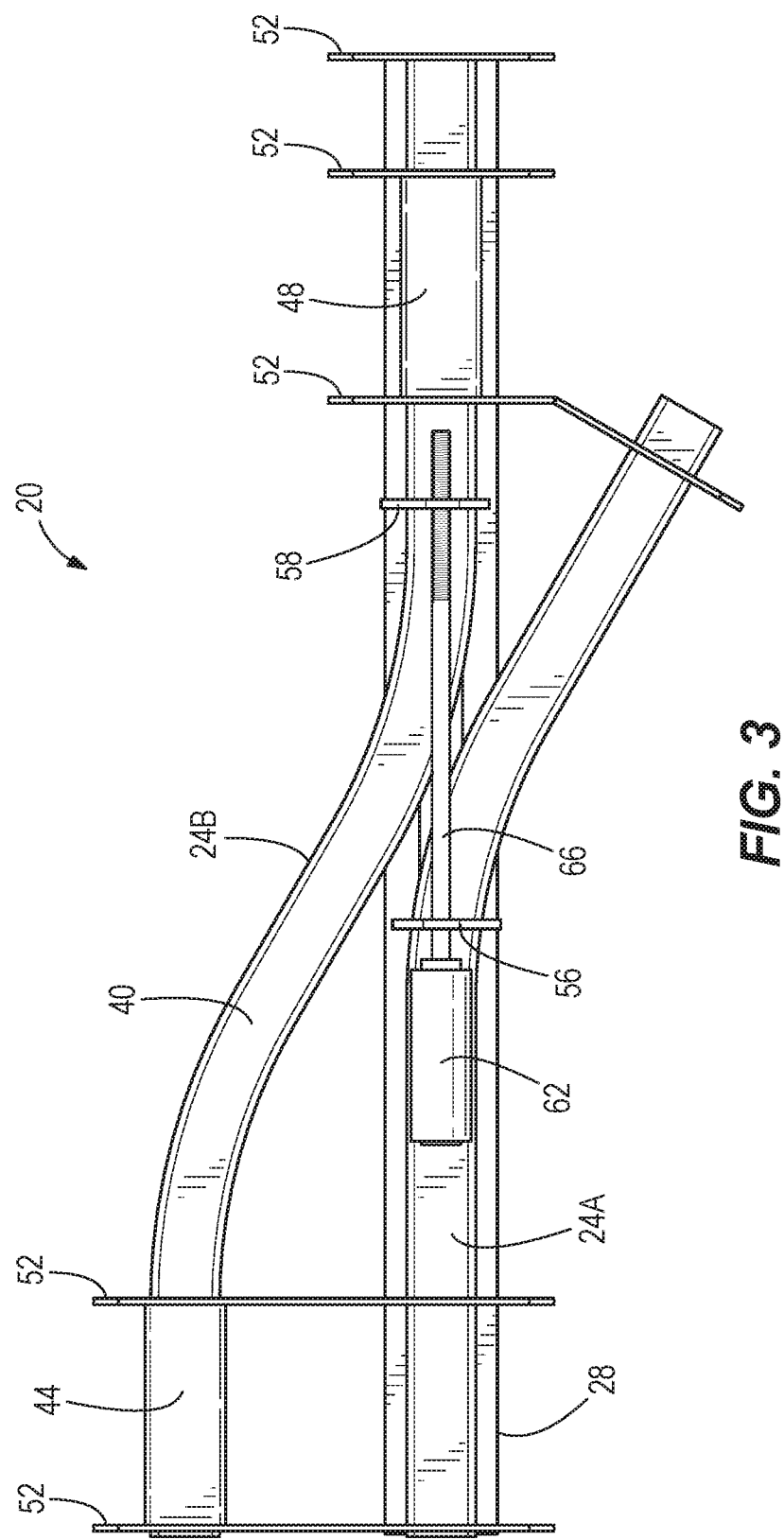
FIG. 3 is a plan view of the conveyor transfer mechanism of FIG. 1.

FIGS. 1-3 illustrate a conveyor transfer mechanism 20 of a power and free conveyor system. The power and free conveyor system is a conveyor system in which a free track supports conveyed items (e.g., by trolleys supported to roll along the free track) and a power track provides a separate drive mechanism to drive the trolley along the free track. The power and free tracks overlie each other in plan view, typically with the power track placed directly above the free track for an overhead conveyor system. The tracks are embodied as conveyor rails, e.g., open section structural member such as hollow extrusions. In some constructions, the power track supports an endless chain having spaced pusher members, which may be referred to as dogs. An exemplary disclosure of trolleys and drive chains of a power and free conveyor system is included in U.S. Pat. No. 5,517,922, the entire contents of which is incorporated by reference herein. The endless chain of a power and free conveyor is motorized to move and drive the trolleys along the free track. Because the drive source is structurally separated from the product support via separate tracks, power and free conveyor systems enable the use of multiple conveyor paths and transfers therebetween. To provide a transfer among power tracks in such a conveyor system, a transfer zone is established in the conveyor system. This is accomplished by driving a trolley with a first power track, diverging the first power track from the path of the free track to "drop off" the trolley (i.e., disengage from driving the trolley), and then converging a second power track to the path of the free track to "pick-up" the trolley (i.e., engage or establish a driving relationship with the trolley). The fundamentals of such a transfer can be found in U.S. Pat. No. 5,517,922. In conventional practice, each of the power tracks is provided by a continuous track or rail having a curved portion along the transfer zone. Once the conveyor system is constructed, the power tracks define fixed paths relative to the free track and relative to each other. Although the power tracks throughout the remainder of the power and free conveyor system may indeed be fixed and non-adjustable, the transfer mechanism 20 of FIGS. 1-3 expressly provides at least one adjustable section of power track as described below.

The transfer mechanism 20 includes two adjacent power tracks 24A, 24B. Each power track 24A, 24B can be a finite segment or section of an endless track defining a corresponding conveyor path. The first power track 24A is designated as the upstream or supplier track, while the second power track 24B is designated as the downstream or receiver track. This means that, during operation of the conveyor system to transfer trolleys from the first power track 24A to the second power track 24B, the trolleys are initially advanced along an adjacent free track 28 by dogs of an endless chain supported by the first power track 24A. The initial direction of conveyance is indicated by arrow A, which is directed along a path defined by the free track 28, parallel to the first power track 24A. In a downstream direction along the first power track 24A, the first power track 24A diverges from the conveyor path defined by the free track 28. This occurs within a selected span or zone 28T of the free track 28. Within the same span 28T, the second power track 24B converges toward the conveyor path defined by the free track 28. Upstream of the span 28T, the second power track 24B can be parallel to the free track 28 and offset to the side, or may have any other orientation that is not following directly above the free track 28. This is because the first power track 24A occupies the space directly above the free track 28 in the area directly preceding the span 28T. The direction of conveyance leaving the transfer mechanism 20 is indicated by arrow B, which is directed along the conveyor path defined by the free track 28, parallel to the second power track 24B. The free track 28 can be a linear track within the transfer mechanism 20 as shown, whereby arrows A and B both refer to a common direction of conveyance, although other constructions may include a non-linear or curved free track (e.g., including one or more arcuate segments) as long as the first and second power tracks 24A, 24B diverge and converge, respectively, from the conveyor path defined by the free track 28.

Due to the curved shapes of each of the power tracks 24A, 24B, the first power track 24A defines a divergence point D, and the second power track 24B defines a convergence point C. These are the points along the axial span of the free track 28 at which the first power track 24A ceases to be aligned above the free track 28 (divergence point D) and at which the second power track 24B first establishes alignment above the free track 28 (convergence point C). Along with the conveyance speed, the mass of the load, and the operational condition of the trolley that rolls along the free track 28, the divergence point D determines the travel parameters of each trolley through the transfer zone between the divergence point D and the convergence point C, which is spaced in the downstream direction from the divergence point D. From the divergence point D, the trolley must have enough speed and total travel range, imparted by the pusher member or dog of the first power track 24A, to reach the convergence point C to be picked up by the pusher member or dog of the second power track 24B. In some cases, it may be critical not only that the trolley travels a sufficient distance to be picked up, but also that the trolley reaches the pickup point in sufficient time to be picked up by the next available pusher member or dog of the second power track 24B.

It will be appreciated that, in practice, the dogs of the power tracks 24A, 24B and the corresponding engagement members on the trolleys have a non-zero width measured horizontally perpendicular to the conveyor axis. Thus, the final point of contact between the dog of the first power track 24A and the trolley will be somewhat downstream of the labeled divergence point D, and likewise, the first point of contact between the dog of the second power track 24B and the trolley will be somewhat upstream of the labeled convergence point C. As will be appreciated, the performance of the trolley handoff between the first and second power tracks 24A, 24B is subject to numerous influences and cannot necessarily be perfectly designed to guarantee flawless operation throughout the life of the conveyor system, especially as changes occur to operational parameters and/or normal wear occurs within the system components. In order to address this inherent shortcoming, an adjustable transfer mechanism as disclosed herein is structured to allow one or both of the power tracks 24A, 24B to be adjusted positionally relative to the other and relative to the free track 28.

The transfer mechanism 20 of FIGS. 1-3 is provided as a section of the power and free conveyor system, and includes individual rail sections of each of the power and free tracks 24A, 24B, 28. Each of these is connected to further upstream and downstream sections (not shown herein) at the respective upstream and downstream ends thereof. Furthermore, between the upstream and downstream ends of the transfer mechanism, at least one of the power tracks 24A, 24B includes a shifting portion 40. As illustrated, the shifting portion 40 is provided solely within the second power track 24B, while the first power track 24A is of a rigid, fixed form from end to end. More particularly, the shifting portion 40 of the second power track 24B is provided as a telescoping portion. As such, the shifting portion 40, which itself may be of rigid form, defines a sliding, nesting interface with both the immediately upstream portion 44 and the immediately downstream portion 48 of the second power track 24B. As shown, these portions 44, 48 can be provided within the transfer mechanism 20, although it is also possible for the shifting portion 40 to telescope with respect to portions of the second power track 24B just upstream and downstream of the transfer mechanism 20. Each of the adjacent portions 44, 48 is formed of a larger size rail to form a clearance fit for receiving the shifting portion 40 therein. While the illustrated shifting portion 40 forms the inner part of a telescoping unit, this may be reversed so that the upstream and downstream portions 44, 48 nest into the shifting portion 40. As shown, the upstream and downstream portions 44, 48 of the second power track 24B can be formed as short lengths of conveyor rail supported by (e.g., welded to) multiple transverse plates 52. The transverse plates 52 also support, e.g., in fixed relationships, the first power track 24A and the free track 28 at each location to define predetermined spacing distances therebetween. The interfaces between the shifting portion 40 and the immediately upstream and downstream portions 44, 48 provide for the adjustment of the curved path defined by the shifting portion 40, without changing the overall length of the transfer mechanism 20 or the second power track 24B thereof. When the shifting portion 40 is moved, one end thereof extends from one of the two adjacent portions 44, 48 while the other end thereof retracts into the other of the two adjacent portions 44, 48.

An adjustment mechanism is provided to enable adjustment and setting of a variety of positions of the shifting portion 40 relative to the remaining fixed structure of the transfer mechanism 20. The adjustment mechanism can include one or more manual adjusters such as handles, levers, slides, knobs, etc., and may optionally include a latching or locking mechanism to secure the shifting portion 40 into a particular desired position. The adjustment mechanism can also or alternately include a partially or fully automated structure in which a controller-driven actuator is activated to effect adjustment of the position of the shifting portion 40 within the transfer mechanism 20. The adjustment(s) may be carried out in an initial setup or installation of the conveyor system. Additionally or alternately, the adjustment(s) may be carried out by a human operator in response to observation of the conveyor system in operation. Additionally or alternately, the adjustment(s) may be carried out unilaterally by the controller in response to sensed operational parameters of the conveyor system, for example, positional data on the trolleys as they are sent from the divergence point D toward the convergence point C.

One exemplary structure of the adjustment mechanism includes brackets 56, 58 provided on the respective first and second power tracks 24A, 24B, such that the first bracket 56 resides at a fixed location along the transfer mechanism 20 and the second bracket 58 is provided on the shifting portion 40 of the second power track 24B to be movable within the transfer mechanism 20. A drive unit can be coupled between the two brackets 56, 58 and operable to selectively increase and selectively decrease a distance between the brackets 56, 58. In one construction, as shown in FIG. 2, the drive unit is a powered drive unit including an electrically-powered actuator 62 such as an electric motor (e.g., servo motor) coupled to a threaded rod 66 to rotate the threaded rod 66. Other examples of powered actuators include hydraulic and pneumatic, among others. The threaded rod 66 can be threaded into the second bracket 58 so that stationary rotation of the threaded rod 66 by the actuator 62 drives the second bracket 58 along the threaded rod 66, thus moving the shifting portion 40 in one of the two adjustment directions as indicated by the double arrow in FIG. 2. The actuator 62 can be operated by a controller 70 as schematically illustrated in FIG. 2. Furthermore, as mentioned above, the controller 70 may receive an input from a sensor 74, or multiple sensors, of the conveyor system. The sensor 74 can monitor, among other things, trolley position within the selected span or zone 28T of the free track 28. This can enable, in some constructions, a method of operation by which adjustment of the shifting portion 40 takes place completely automatically or autonomously according to a controller program to ensure consistent, complete trolley handoffs without the need for human operator supervision or intervention. In other constructions, the sensor 74 can report a signal to the controller 70 for notifying a human operator of the need to perform an adjustment. The notification may be delivered through a user interface of the conveyor system, or any suitable electronic device that can be network connected to the conveyor system. The same or different user interface may be used for the operator to command an adjustment of the actuator 62 through the controller 70. The transfer mechanism 20 can therefore be adjusted on-site, or even remotely from other places within the particular industrial site, or virtually any geographical location remote from the industrial site having the conveyor system.

Although the drawings illustrate one particular structure for a transfer mechanism in which one of two power tracks is lengthwise adjustable for fine tuning a trolley transfer or handoff, other variations will be appreciated by one of skill in the art in view of the disclosure. For example, adjustment of the shifting portion 40 need not be provided by telescoping the rail section at both ends. Rather, one or both ends of the shifting portion 40 can have flexible portions that are expandable and collapsible, e.g., as a bellows section. Further, while linear adjustment of the shifting portion 40 provides for a convenient pair of sliding interfaces with the adjacent sections 44, 48, other constructions can include one or two fixed ends for the shifting portion 40, which can be provided with a flexible portion between its ends. In such cases, the shifting portion 40 may be actuated for bending or flexing to change shape and/or orientation with respect to the free track 28. In some constructions, portions of both the first and second power tracks 24A, 24B can be supported for adjustment, together in a dependent relationship, or independently of one another.

The setting of the transfer mechanism (i.e., the positioning of the shifting portion 40) can be controlled according to a base algorithm, either with or without the sensor 74. The base algorithm can predict and set different appropriate positions of the shifting portion 40 based on conveyor operating conditions (e.g., speeds of the power tracks 24A, 24B, trolley loading, etc.).

Figure 4:
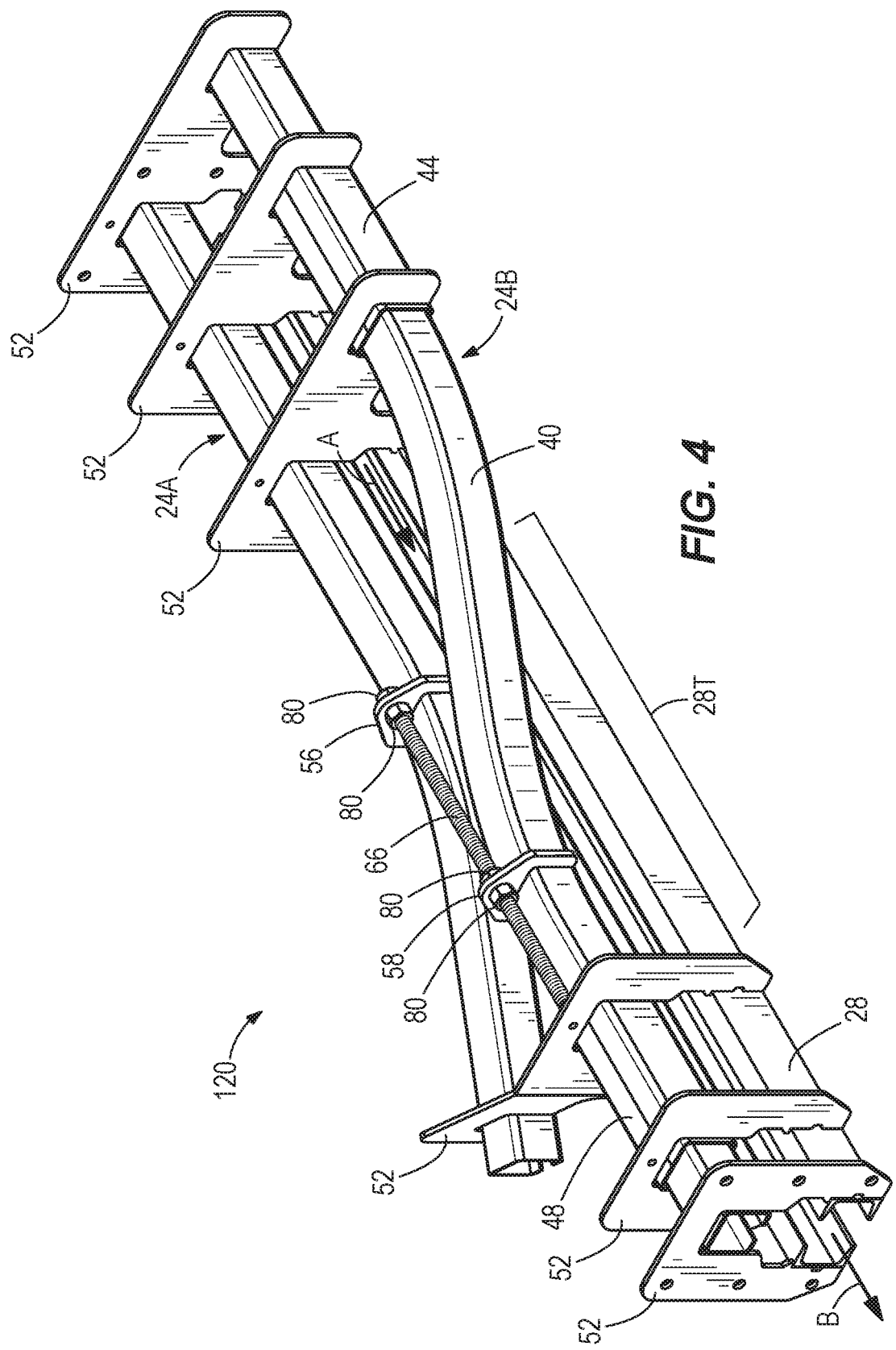
FIG. 4 is a perspective view of a conveyor transfer mechanism according to another embodiment.
Figure 5:
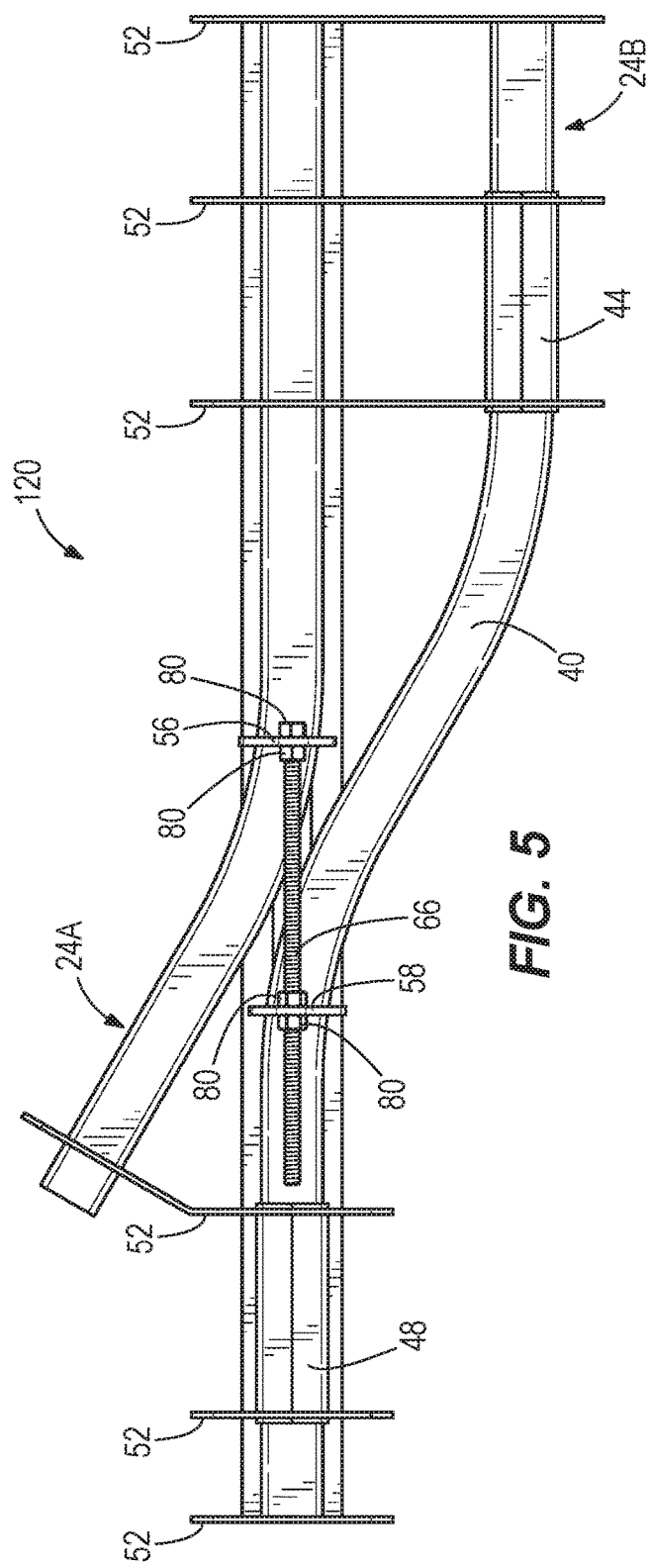
FIG. 5 is a plan view of the conveyor transfer mechanism of FIG. 4.
Figure 6:
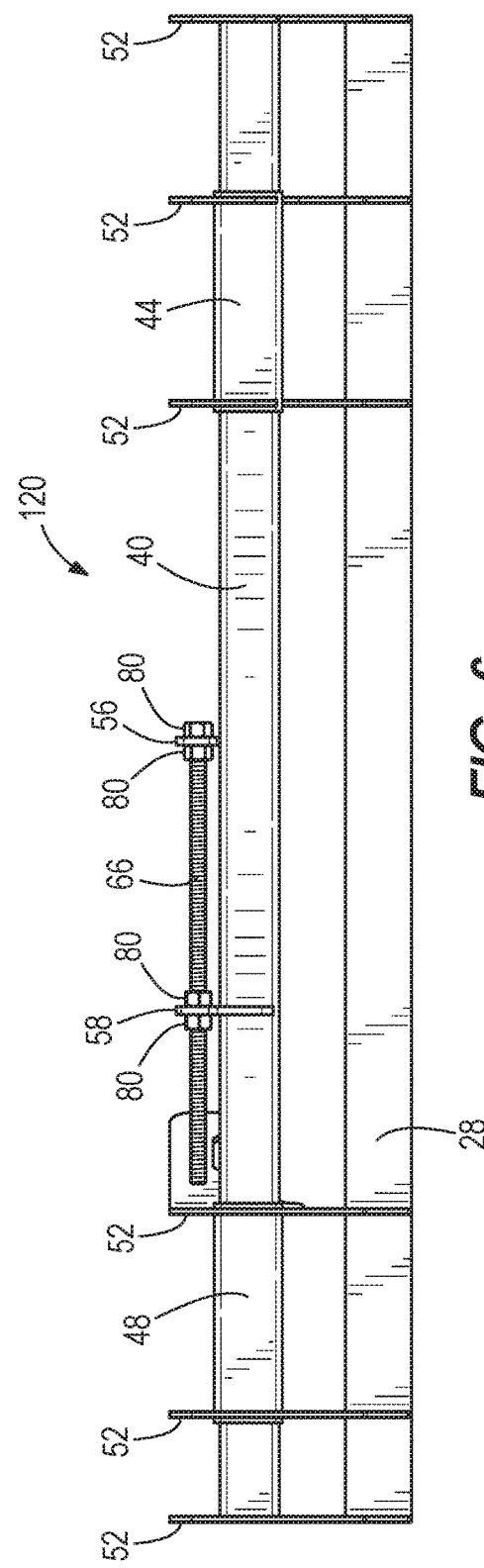
FIG. 6 is a side elevation view of the conveyor transfer mechanism of FIG. 4.

In FIGS. 4-6, another transfer mechanism 120 is shown. The transfer mechanism 120 of FIGS. 4-6 may be identical in construction as that of FIGS. 1-3, with the exception of the adjustment mechanism. Thus, a general description of the transfer mechanism 120 is not separately provided with the understanding that reference can be made to the above description of FIGS. 1-3. Rather than having a powered drive unit for operating the adjustment mechanism (either autonomously or under direct operator control), the adjustment mechanism as shown in FIGS. 4-6 is a manual adjuster including a threaded rod 66 extending through both of the two brackets 56, 58. The threaded rod 66 can be in threaded engagement with one, both, or neither of the brackets 56, 58. As shown, a relative distance between the two brackets 56, 58 can be set and maintained simply by placement of a nut 80 on each side of each of the brackets 56, 58. The movement of the nuts 80 along the threaded rod 66 allows a worker to set a desired position at the initial installation time of the conveyor assembly. Loosening and readjustment of the nuts 80 can additionally be carried out at any time in the future as part of a service or adjustment procedure. Thus, the nuts 80 function as a selective locking mechanism that can lock and release the adjustment position of the shifting portion 40, although many other constructions of locking mechanisms are also contemplated, including latches, pins, etc. Any of the embodiments herein may include any such type of selective locking mechanism.

Figure 7:
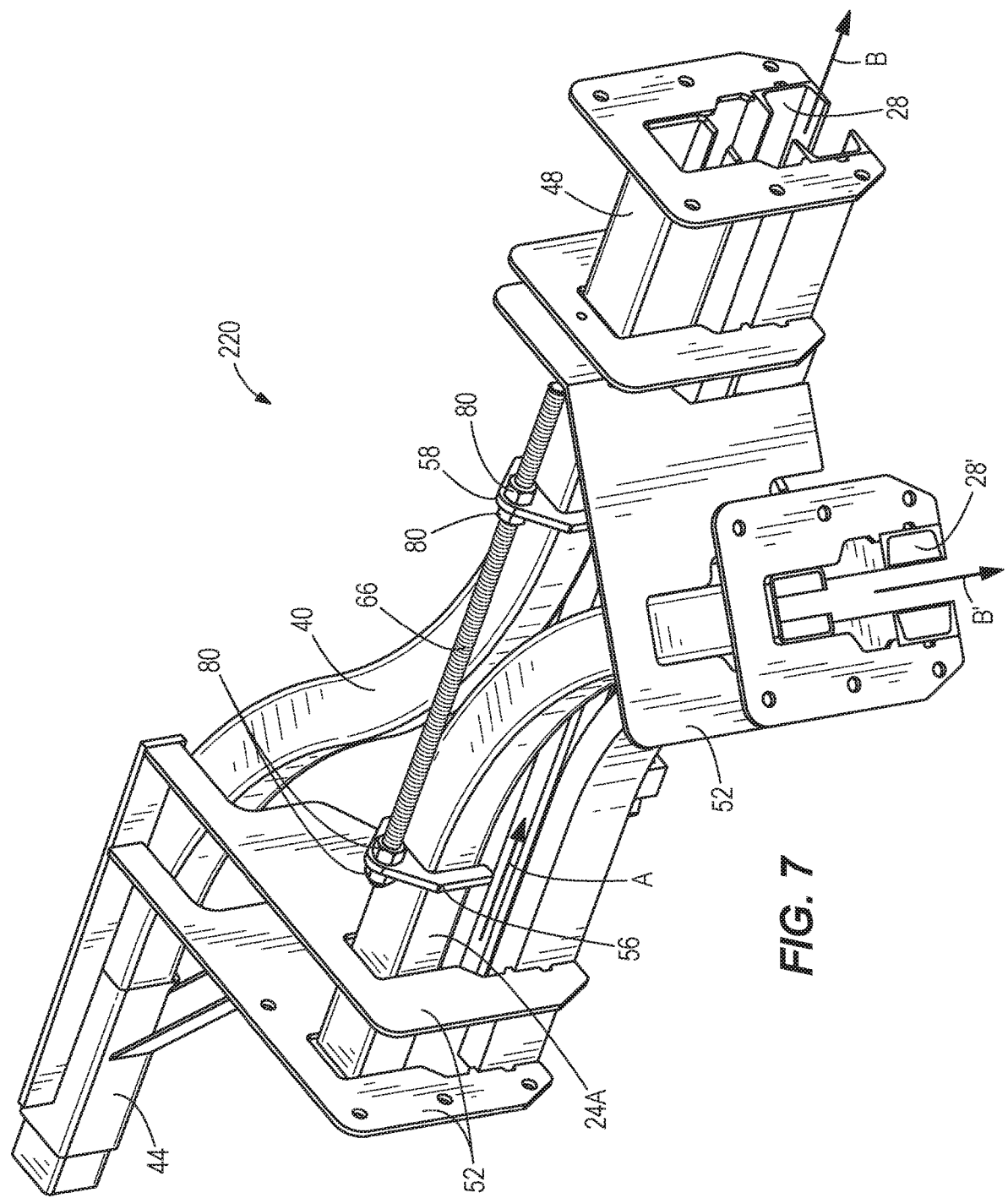
FIG. 7 is a perspective view of a conveyor transfer mechanism according to yet another embodiment.

In FIG. 7, yet another transfer mechanism 220 is shown. The transfer mechanism 220 of FIG. 7 may conform to the above description(s) of features noted for either of the transfer mechanisms 20, 120 of FIGS. 1-6, except as noted below. The conveyor transfer mechanism of FIG. 7 is adapted for use with a free track switch, rather than just a power track switch. Thus, whereas the transfer mechanisms 20, 120 include one and only one path for item conveyance, defined by the single free track 28, the transfer mechanism 220 includes both a primary free track 28 and a separate branch or secondary free track 28'. The transfer mechanisms 20, 120 can be used to hand-off the driving task between two different driving mechanisms (e.g., separate drive chains of the power tracks 24A, 24B, for example operable at different drive speeds) in accordance with the above description. However, the transfer mechanism 220 can additionally enable switching conveyed products among at least two conveyor paths defined by the free tracks 28, 28'. As illustrated, the primary free track 28 defines an exit path of conveyance (arrow B) that is in line with the initial path of conveyance (arrow A) of the transfer mechanism 220, and the secondary free track 28' defines an alternate exit path of conveyance (arrow B') that diverges (e.g., to a skew direction with respect to arrows A, B). In other constructions, the arrangement of the branching free track 28' may be different (e.g., different length, angle, opposite side, etc.). It is also conceived that both paths of conveyance (arrows B, B') can branch from the initial path of conveyance (arrow A).

Figure 8:
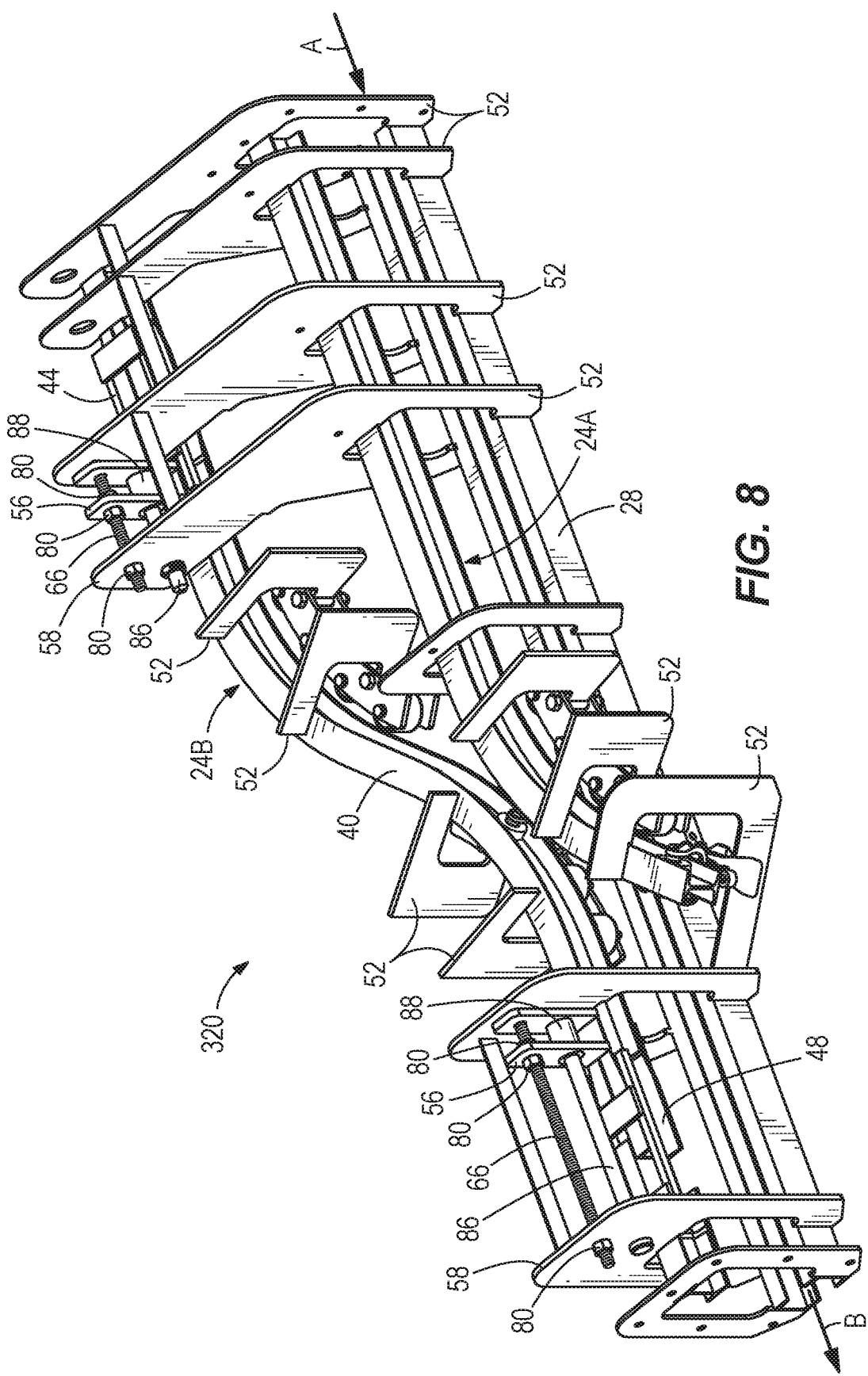
FIG. 8 is a perspective view of a conveyor transfer mechanism according to yet another embodiment.

In FIG. 8, yet another transfer mechanism 320 is shown. The transfer mechanism 320 of FIG. 8 may conform to the above description(s) of features in any particular combination. For example, the transfer mechanism 320 can have an adjustment mechanism provided with a powered drive unit or by way of a manual adjuster, and the transfer mechanism 320 may or may not be provided with a free track switch, although the free track switch is not illustrated. The transfer mechanism 320 of FIG. 8 is included to illustrate an alternate rail construction for the power tracks 24A, 24B that have an I-beam cross-section shape rather than the hollow box profile shown in the preceding figures. The power track cross-section construction can be chosen as desired while retaining the other features described above, including the shifting portion 40. The illustrated shifting portion 40 is provided as a telescoping portion that telescopes or nests into one adjacent power track portion as it telescopes or extends out of the opposite adjacent power track portion during adjustment. Also, although not required in all constructions, the transfer mechanism 320 of FIG. 8 is provided with separate adjustment mechanisms at the respective ends of the shifting portion 40. This is a feature that can optionally be provided in any of the prior embodiments as well. In addition to the threaded rod 66, the brackets 56, 58, and the nuts 80, each adjustment mechanism can also include a separate guide rod 86 extending parallel with the threaded rod 66 between the brackets 56, 58. A sleeve 88 is guided along the guide rod 86. The sleeve 88 in each case can be fixed with respect to the first bracket 56. The guide rods 86 and sleeves 88 of the adjustment mechanisms aid in maintaining proper alignment of the shifting portion 40, especially in cases where it has a limited amount of guiding contact with the adjacent track sections 44, 48.

Various features of the invention are set forth in the claims below.

What is claimed is:

1. An adjustable transfer mechanism for a power and free conveyor system, the adjustable transfer mechanism comprising:
    a free track defining a conveyor path for receiving a trolley to be conveyed;
    a first power track defining a first drive path for a first drive member of the first power track to drive the trolley along the free track, wherein the first power track is positioned to extend along the conveyor path up to a divergence point where the first power track diverges from the conveyor path so that the first drive member can drop off the trolley within a transfer zone; and
    a second power track defining a second drive path for a second drive member of the second power track to drive the trolley along the free track, wherein the second power track is positioned to extend along the conveyor path from a convergence point in a downstream direction from the divergence point so that the second drive member can pick up the trolley within the transfer zone,
    wherein at least one of the divergence and convergence points is adjustable along the conveyor path.

2. The adjustable transfer mechanism of claim 1, wherein at least one of the first and second power tracks includes a shifting portion telescopically joined with respect to at least one adjoining power track section in order to provide adjustment of the at least one of the divergence and convergence points along the conveyor path.

3. The adjustable transfer mechanism of claim 2, wherein the shifting portion is telescopically joined with respect to upstream and downstream adjoining power track sections.

4. The adjustable transfer mechanism of claim 2, further comprising an adjustment mechanism operable to move the shifting portion, wherein the adjustment mechanism includes at least one manual adjuster.

5. The adjustable transfer mechanism of claim 4, wherein the manual adjuster includes a threaded rod engaged with a bracket secured on the shifting portion.

6. The adjustable transfer mechanism of claim 2, further comprising an adjustment mechanism operable to move the shifting portion, wherein the adjustment mechanism includes a powered actuator connected with and operable to move the shifting portion.

7. The adjustable transfer mechanism of claim 6, further comprising a controller coupled with the powered actuator to provide a movement signal for moving the powered actuator, and a sensor operable to detect a position of a trolley within the transfer zone, wherein the controller is programmed to provide a movement signal based on the trolley position detected by the sensor.

8. The adjustable transfer mechanism of claim 6, wherein the adjustment mechanism includes a threaded rod rotatable by the powered actuator, and wherein the threaded rod is threaded to a bracket secured on the shifting portion.

9. The adjustable transfer mechanism of claim 2, further comprising a locking mechanism operable to secure the shifting portion against movement along the conveyor path.

10. The adjustable transfer mechanism of claim 1, wherein the free track defines an additional conveyor path for a free track switch.

11. The adjustable transfer mechanism of claim 1, wherein the first and second power tracks have a cross-section shape selected from the group consisting of: an I-beam and a hollow box.

12. A method of operating a power and free conveyor system including an adjustable transfer mechanism, the method comprising:
    providing a first power track that extends along a conveyor path defined by a free track and subsequently diverges from the conveyor path to define a drop-off point whereby a first drive member of the first power track disengages from driving a first trolley positioned on the free track;
    providing a second power track that converges toward the conveyor path to define a pick-up point whereby a second drive member of the second power track engages with the first trolley positioned on the free track;

operating an adjustment mechanism to adjust a spacing between the drop-off point and the pick-up point by re-positioning a section of at least one of the first and second power tracks within the adjustable transfer mechanism so that a distance between the drop-off point and the pick-up point is increased or decreased; and operating the first power track and the second power track to transfer a subsequent trolley therebetween with the adjusted spacing between the drop-off point and the pick-up point.

13. The method of claim 12, wherein the spacing is adjusted by telescoping a shifting portion of one of the first and second power tracks with respect to at least one adjoining power track section.

14. The method of claim 13, wherein the spacing is adjusted by telescoping the shifting portion with respect to both upstream and downstream adjoining power track sections.

15. The method of claim 13, wherein telescoping the shifting portion to adjust the spacing is accomplished by turning a threaded rod engaged with a bracket secured on the shifting portion.

16. The method of claim 15, wherein the threaded rod is turned by a powered actuator supported on the adjustable transfer mechanism.

17. The method of claim 16, further comprising operating a sensor to detect a position of the first trolley between the drop-off and the pick-up and provide a representative signal to a controller, wherein the controller is programmed to select an amount for the spacing adjustment and to command the adjustment mechanism to carry out the spacing adjustment to achieve the selected amount.

18. The method of claim 17, further comprising operating the sensor to detect a position of the subsequent trolley between the drop-off and the pick-up and provide a representative signal to the controller as feedback.

19. The method of claim 13, further comprising unlocking a locking mechanism to free the shifting portion prior to operating the adjustment mechanism to adjust the spacing, and re-locking the locking mechanism following the operation of the adjustment mechanism to adjust the spacing.

20. The method of claim 12, wherein operating an adjustment mechanism is performed at a first end of a shifting portion of one of the first and second power tracks and is performed simultaneously with operating a second adjustment mechanism at a second end of the shifting portion.

* * * * *